United States Patent [19]
Mineo et al.

[11] Patent Number: 6,101,295
[45] Date of Patent: Aug. 8, 2000

[54] HIGH-FREQUENCY CIRCUIT, OPTICAL MODULE EMPLOYING SAME, AND METHOD OF MATCHING IMPEDANCE

[75] Inventors: Naoyuki Mineo; Shunji Sakai, both of Tokyo, Japan

[73] Assignee: Oki Electric Industry Co., Ltd., Tokyo, Japan

[21] Appl. No.: 09/112,016

[22] Filed: Jul. 8, 1998

[30]  Foreign Application Priority Data

Jul. 24, 1997  [JP]  Japan ................................. 9-198681

[51] Int. Cl.⁷ ................................ G02F 1/01; H03H 7/28
[52] U.S. Cl. .................... 385/1; 385/2; 385/8; 385/88; 359/254; 333/33
[58] Field of Search .................................. 385/1, 2, 4, 8, 385/9, 88, 89, 93, 33; 359/254; 333/33

[56]  References Cited

U.S. PATENT DOCUMENTS 5,221,988  6/1993  Juhasz ..................................... 359/254

OTHER PUBLICATIONS

"Semiconductor Optical Switches/Modulators and Their Packaging", Kairo Jisso Gakkaishi (Journal of the Circuit Packaging Association), vol. 10, No. 5, 1995, pp. 306–309.

*Primary Examiner*—Jon Henry
*Attorney, Agent, or Firm*—Rabin & Champagne, P.C.

[57]  ABSTRACT

A high-frequency circuit exhibiting favourable characteristics even in frequency domains in excess of 40 GHz is obtained by configuring a matching circuit 40 with open stubs 16 joined to a microstrip line 14.

18 Claims, 7 Drawing Sheets

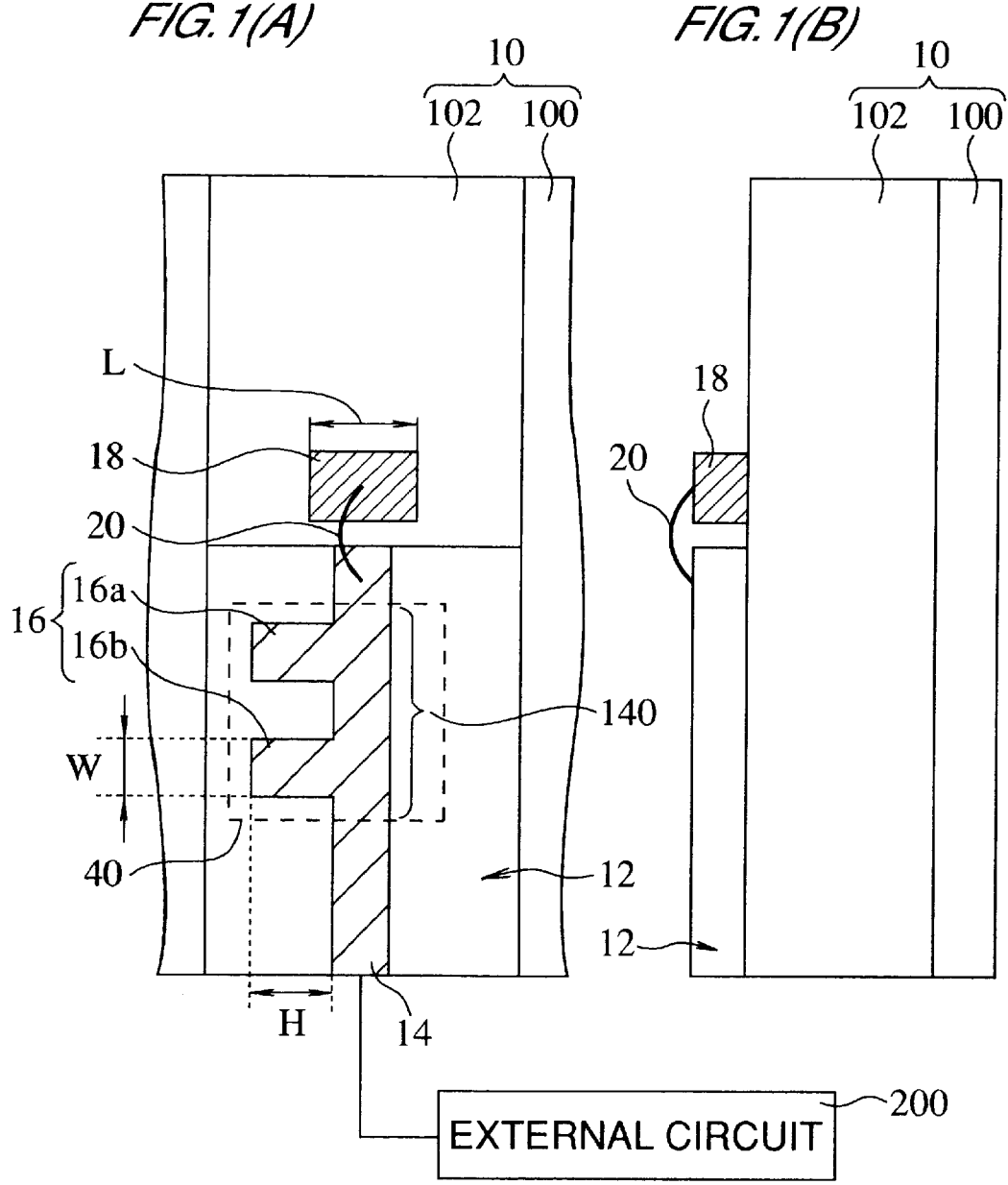

HIGH-FREQUENCY CIRCUIT, OPTICAL MODULE EMPLOYING SAME, AND METHOD OF MATCHING IMPEDANCE

BACKGROUND TO THE INVENTION

1. Field of the Invention

The present invention relates to a high-frequency circuit, an optical module employing the same, and a method of matching the impedance.

2. Description of the Related Art

A conventional example of an optical module employing a high-frequency circuit is provided by an optical modulation device. The configuration of such a device is described in the literature ("Semiconductor Optical Switches/Modulators and Their Packaging" Kairo Jissô Gakkaishi [Journal of the Circuit Packaging Association] Vol.10, No.5, 1995, pp.306–309).

The conventional optical modulation device comprises a first lens (non-spherical lens), optical modulator (electroabsorption optical modulator) and a second lens (spherical lens) having mutually matching optical axes and arranged linearly on a carrier with a convex section.

Facing the electroabsorption optical modulator and intersecting its optical axis at right-angles are located on a high-frequency substrate a microstrip line and a terminating resistor. Connected to the microstrip line and fixed to the package is located a high-frequency connector.

The terminal of the optical modulator and the microstrip line are connected with the aid of bonding wire.

In the conventional optical modulation device, the high-frequency substrate which forms the microstrip line and the terminating resistor needs to be at least 1 mm wide, and it is impossible for the width of the carrier on which the optical modulator is mounted to be less than that of the highfrequency substrate. As a result, the conventional optical modulator is roughly the same width as the high-frequency substrate.

Moreover, the modulation zone of the electroabsorption optical modulator is restricted by the element capacity of this modulation device, and therefore element length is kept short (100 $\mu$m or less) in order to ensure low capacity. Use of an optical modulation device of this type permits attainment of a modulation zone of around 40 GHz.

There are also reports of examples of the use of electroabsorption optical modulators with integrated waveguide where the modulator area is shortened and waveguide areas are provided on either side of it in order to prevent optical scattering of incident light.

However, these conventional optical modulation devices are fraught with problems as outlined below.

If the modulator elements are kept short in order to ensure low capacity, the abovementioned optical modulation devices which employ electroabsorption optical modulators or electroabsorption optical modulators with integrated waveguide show high frequency response characteristics of 40 GHz or above. This means that in any attempt to adopt them for use in frequency domains in excess of 40 GHz, it is extremely difficult to match the impedance between the high-frequency circuit containing the modulator on the one hand and other circuits, for instance, the high-frequency power supply circuit, driver circuit or amplifier circuit on the other hand.

It is an object of the present invention to provide a high-frequency circuit, optical module employing the same, and method of matching impedance which exhibit favourable characteristics even in frequency domains in excess of 40 GHz.

SUMMARY OF THE INVENTION

For this reason, the high-frequency circuit to which the present invention pertains is provided with a microstrip line, an optical semiconductor element located at the tip of the microstrip line, and open stubs joined to the microstrip line. The stubs and the section of the microstrip line to which the stubs are joined constitute a matching circuit. Impedance matching between the high-frequency circuit and an external circuit or other circuit connected to it is achieved by means of this matching circuit.

Inasmuch as this matching circuit makes it possible during production of the high-frequency circuit to ensure that its impedance matches that of the high-frequency circuit and other circuit such for example as a high-frequency power supply circuit, superior characteristics can be attained in relation to high frequency regions or domains in comparison with conventional high-frequency circuits.

Meanwhile, the method of ensuring matching impedance to which the present invention pertains serves to match the impedance of a high-frequency circuit comprising the microstrip line and an optical semiconductor element located at the tip of the microstrip line to that of an external circuit connected to the high-frequency circuit. A matching circuit is formed by providing the microstrip line with open stubs joined thereto. The optical semiconductor element is driven by means of a high-frequency signal, and the stubs are trimmed with regard either to its length, width or both. The impedance of the high-frequency circuit is measured after trimming, and the last two steps are repeated until the impedance of the high-frequency circuit matches that of other circuit which is connected to it.

By trimming the open stubs with regard either to their length, width or both, the present invention permits greater precision of impedance matching between the high-frequency circuit containing the stubs, and the other circuits connected to it. This is so even in the face of uneven optical semiconductor element impedance. Consequently, it is possible to achieve high-frequency characteristics in excess of 40 GHz, which had hitherto been unattainable when using an optical modulator as an optical semiconductor element.

Moreover, the optical module to which the present invention pertains employs a high-frequency circuit having a microstrip line and an optical semiconductor element located at the tip of the microstrip line.

This high-frequency circuit is provided with a matching circuit which comprises a microstrip line and open stubs joined to the microstrip line.

In the optical module of this construction, the matching circuit permits impedance matching between the high-frequency circuit and other circuits during production, thus making it possible to achieve excellent high-frequency characteristics.

In the implementation of the present invention, it is desirable that the optical semiconductor element comprise an optical modulator with waveguide area, and that the waveguide area extend in a direction which intersects at right-angles the direction of orientation of the microstrip line.

Adoption of a high-frequency circuit having an optical modulator with waveguide of this sort for use in an optical module means that the length of the waveguide area is adjusted to match the position of the open stubs even where this and the position of the microstrip line have changed. Thus, provided the lens on the incident light side or on the emitted light side is set in a suitable position, it is possible in contrast to an optical modulator without waveguide area to distance it from the optical modulator with waveguide by the length of the waveguide area. This in turn makes it possible to prevent the lens and high-frequency circuit from impinging on each other.

BRIEF DESCRIPTION OF THE DRAWINGS

The forgoing and other objects, features and advantages of the present invention will be better understood from the following description taken in connection with the accompanying drawings, in which:

FIG. 1(A)–FIG. 1(B) are top and side views for explaining the configuration of the high-frequency circuit to which the first embodiment of the present invention pertains;

DESCRIPTION OF THE PREFERRED EMBODIMENTS

There follows, with reference to the drawings, a description of the preferred embodiments of the high-frequency circuit, the optical module employing the same, and the method of matching the impedance to which the present invention pertains. In these embodiments, the high-frequency circuit is described particularly in relation to its use in an optical modulation device. FIGS. 1, 2, 5, 6 and 7 depict the shape, size and positional relationship of each of the components in outline only insofar as they may facilitate understanding of the description.

FIGS. 1(A), 1(B), 2(A), 5, 6(A), 6(B) and 7 are not cross-sectional drawings, but hatching has been adopted in places with a view to emphasising certain components.

Figure 2A:
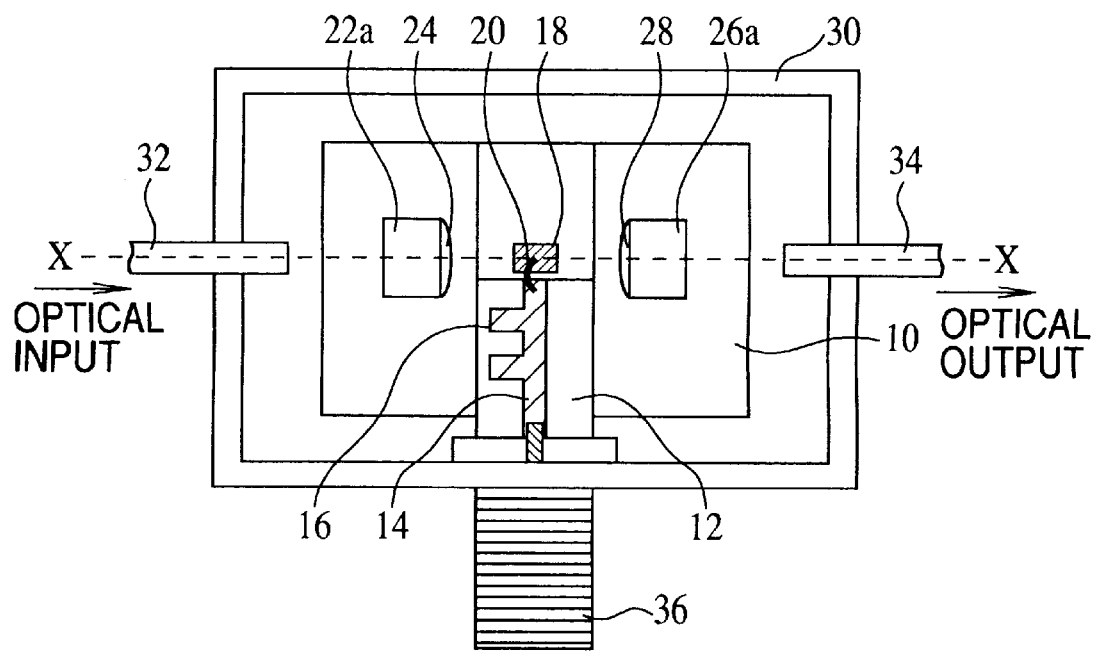
FIG. 2(A)–FIG. 2(B) are partial top and cross-sectional views for explaining the configuration of the high-frequency circuit to which the first embodiment of the present invention pertains.
Figure 2B:
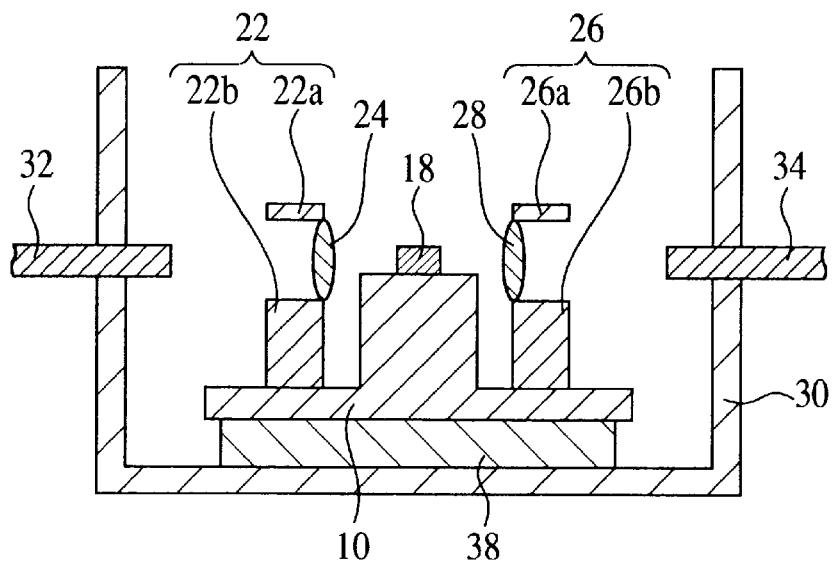

Before the configuration of the high-frequency circuit to which the present invention pertains is described, that of the optical module into which it is incorporated will be explained in outline with particular reference to the optical modulation device. FIG. 2(A) is a partial top view showing the overall configuration of the optical modulation device, while FIG. 2(B) is a cross-sectional view along the line X—X in FIG. 2(A).

The optical modulation device has a base-substrate (carrier) 10 with a convex section, a high-frequency substrate 12 and an optical modulator 18 located on the upper surface of the convex section of the carrier 10, optical parts (a first lens holder 22 with a first lens 24, and a second lens holder 26 with a second lens 28), and an electron cooling element 38. These constituent optical parts are housed within a package 30. To the side of the package 30 are attached a pair of optical fibers 32 and 34, and a high-frequency connector 36. The optical fiber 32, first lens 24, optical modulator 18, second lens 28 and optical fiber 34 are located linearly in such a manner that their optical axes tally. The above configuration is the same as the conventional one.

In the optical modulation device to which the present invention pertains, open stubs are provided on the high-frequency substrate, and a high-frequency circuit is employed wherein these stubs and the section of the microstrip line to which the stubs are joined constitutes a matching circuit. (The configuration of the high-frequency circuit is described in detail below.)

(First Embodiment: High-Frequency Circuit)

Next, the configuration of the high-frequency circuit to which the first embodiment of the present invention pertains will be described with reference to FIG. 1(A) and FIG. 1(B). FIG. 1(A)–FIG. 1(B) are top and side views for explaining the configuration of the high-frequency circuit to which the first embodiment of the present invention pertains.

The high-frequency circuit to which the first embodiment of the present invention pertains comprises a base-substrate 10, a high-frequency substrate 12, an optical modulator 18 and a bonding wire 20.

The base-substrate 10 is here provided by an electrically conductive carrier. This carrier 10 comprises a flat plate 100 and a convex section 102 (also known as a 'carrier') in the shape of a rectangular parallelepiped, which is connected to the flat plate 100 in such a manner as to form a single whole. On the upper surface of the convex section 102 is located the high-frequency substrate 12, which is the same width as the convex section 102. Here the flat plate 100 and the convex section 102 are formed as a single body from one member, but the convex section 102 may also be fitted as a separate member on top of the flat plate 100.

On top of the high-frequency substrate 12 are located a microstrip line 14, two open stubs 16 (16a and 16b) which are joined to it, and an optical modulator 18. It should be added that in the present example of the configuration, the microstrip line 14 is configured in the form of a band-shaped body of the same width. The direction of orientation of the microstrip line 14 faces in the longitudinal direction of the high-frequency substrate 12, which is to say in a direction which intersects the optical modulator 18 at right-angles. Moreover, the two open stubs 16 (16a and 16b) are located in such a manner as to be connected to the microstrip line 14 as a single body while intersecting it at right-angles. In the present example of the configuration, these stubs 16a and 16b are formed in a rectangular shape, and located on one side of the line 14 in such a manner as to be separate from each other and to protrude in a parallel fashion.

Thus, in this first embodiment, a matching circuit 40 is configured from the two open stubs 16a and 16b, and a part 140 of the optical modulator 18 side of the microstrip line 14. This matching circuit 40, which is delineated in FIG. 1(A) by means of a broken line, serves to match the impedance of the high-frequency circuit with that of another circuit 200, here an external circuit. In this example, the external circuit 200 is a high-frequency power supply circuit, driver circuit, amplifier circuit or the like. Where the output impedance of these circuits is 50 Ω, the length and/or width of one or both of the two stubs 16a and 16b is adjusted to that the impedance of the matching circuit 40 is also 50 Ω. Moreover, the present embodiment has described an example where there are two open stubs 16, but the number of open stubs may be either reduced to one or increased to three or more depending on the configuration of the semiconductor of the optical modulator. What is more, the description has assumed that the two open stubs 16a and 16b are formed so as to intersect the microstrip line 14 at right-angles, but there is no restriction whatsoever on their shape, and either one or both of the open stubs 16a and 16b may for instance be located in a slanting fashion.

The optical modulator 18 employed in the present embodiment is the same as the conventional electroabsorption one. This electroabsorption optical modulator 18 is located on the convex section 102 of the carrier 10 in such a manner as to face the microstrip line 14 while intersecting with it at right-angles.

The electroabsorption optical modulator 18 and microstrip line 14 are connected by means of the bonding wire 20. This bonding wire 20 is kept short in order to reduce transmission loss in the high-frequency signal.

[Explanation of the Method of Matching Impedance in First Embodiment]

There follows, with reference to FIGS. 1 and 2, an explanation of the method of matching impedance using the high-frequency circuit to which the first embodiment of the present invention pertains.

The impedance value of the optical semiconductor element and that of the high-frequency circuit to which it is fitted are normally different, with the result that it is necessary to adjust the matching circuit for every sample.

It is therefore a pre-condition that the open stubs 16 are formed wider and longer than their envisaged width and length. The configuration example which follows assumes that there are two open stubs 16. The effect of these two stubs 16a and 16b on the impedance characteristics of the high-frequency circuit differs.

Impedance matching may be implemented with the high-frequency circuit in either drive or no-drive state.

In the present embodiment described below, impedance matching is implemented on the high-frequency circuit to which the first embodiment pertains. The prescribed high-frequency signal is input from the side of the high-frequency connector 36 to put the optical modulator 18 in drive state.

Next, the length of the open stub or stubs 16a and/or 16b which form the matching circuit 40 is adjusted by trimming the edge sections. This is referred to as trimming the length (H). Once the length has been trimmed, the impedance between the carrier 10 of the high-frequency circuit and the microstrip line 14 is measured.

This trimming involves the physical removal of the length or width of the stub, which is formed of a thin or thick metal film. It is a technique which is in general use for adjusting the resistance value of thin-film resistors. In the present embodiment, the stubs are irradiated with a high-output laser beam, and the resultant heat causes the metal of which the stubs are formed to evaporate.

Impedance is measured using a commercially available network analyser (normal name for the measuring device) such as those manufactured by Hewlett Packard (Japan) KK or Advantest KK. Once the prescribed operations/calibrations have been performed, the measuring device is connected to the high-frequency circuit, and its impedance is measured together with its return loss. The impedance value measured in this manner is compared with the output impedance of the external circuit, e.g. 50 Ω, to judge or determine whether impedance matching has been achieved.

If impedance matching is inadequate, the stubs are trimmed further, and impedance matching assessed once more. In the present example, impedance characteristics are used to determine which of the two stubs is to be trimmed. The selected stub is then trimmed a little, and impedance matching assessed. This operation is repeated until the impedance of the high-frequency circuit and the output impedance of the external circuit match.

Thus, the impedance of the high-frequency circuit is matched with that of an external circuit 200 such for example as the high-frequency power supply circuit, driver circuit, amplifier circuit or other external circuit which is connected to it. It should be added that while in this example a method has been described whereby the length of the open stubs 16 has been trimmed to match that of another circuit, the method is in no way restricted to this one, and it is also possible to adjust the width by trimming the sides of the stubs 16. This is referred to as trimming the width (W). Moreover, it is also feasible to trim both the length and width of the open stubs 16.

Figure 3:
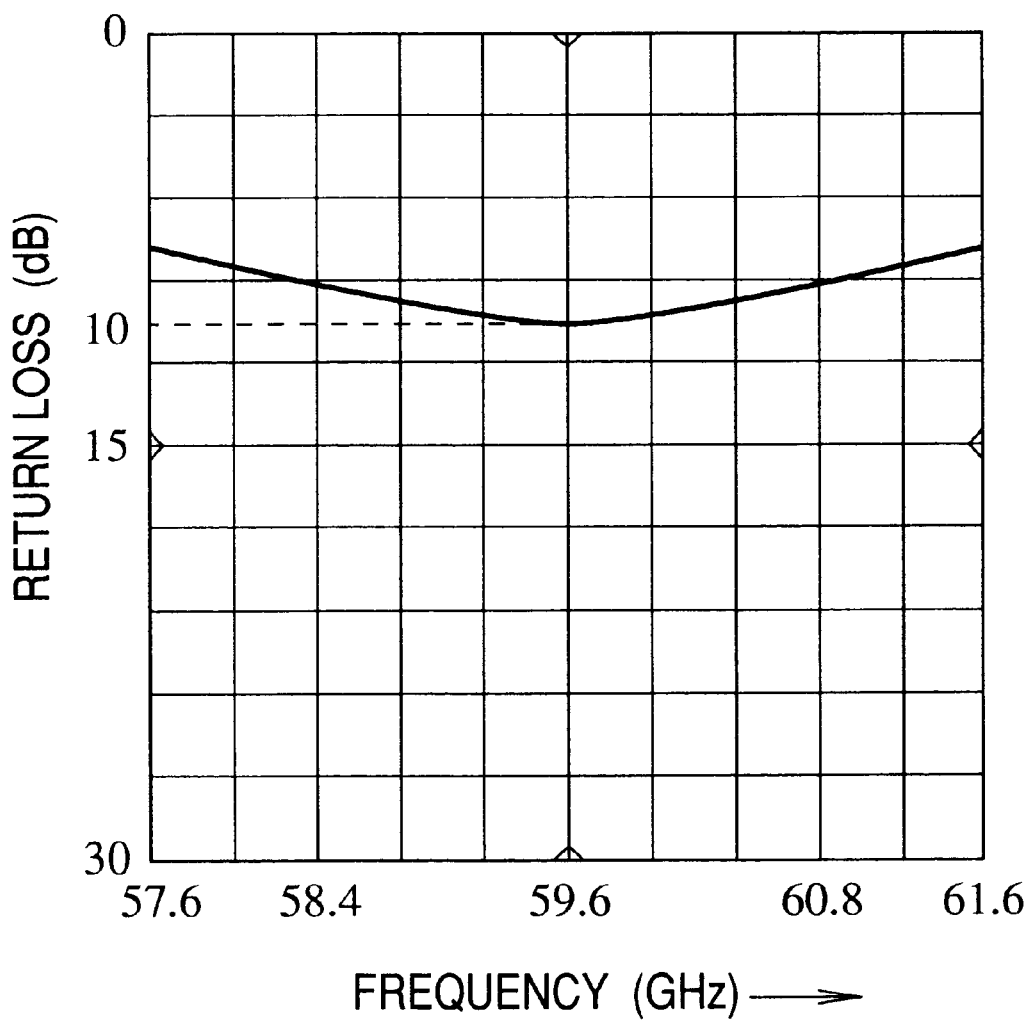
FIG. 3 is a diagram illustrating frequency-return loss characteristics where matching of the high-frequency circuit in the first embodiment of the present invention is inadequate.
Figure 4:
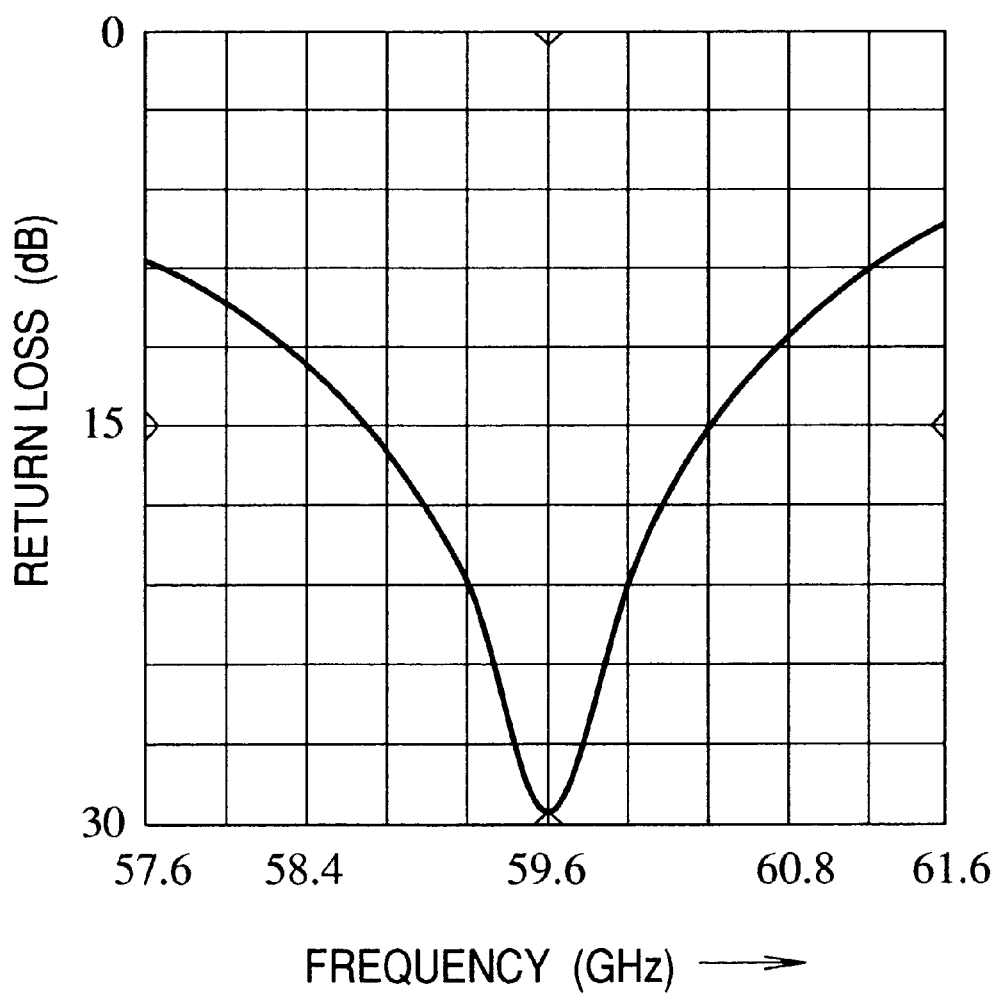
FIG. 4 is a diagram showing frequency-return loss characteristics where matching of the high-frequency circuit in the first embodiment of the present invention has been optimised.

Next, the return loss characteristics (also known as the S11 parameters) when impedance matching has been achieved using the high-frequency circuit of the first embodiment will be explained with reference to FIGS. 3 and 4. Here, FIG. 3 illustrates return loss characteristics where matching of the high-frequency circuit is inadequate, while FIG. 4 illustrates them where matching of the high-frequency circuit has been attained. In both these graphs the vertical axis represents return loss (dB), while the horizontal axis represents frequency (GHz). In order to facilitate comprehension, return loss has been represented in the minus direction of the vertical axis, with 0 as criterion. It should be added that the circuit used for calculating return loss is the high-frequency circuit which has been described in the first embodiment.

The method of calculating return loss is as follows. A high-frequency signal is input at will from the microstrip line side, and electric power $P_1$ is input by way of the input terminal (not depicted in the drawings). The returning electric power $P_2$ reflected by the electric power $P_1$ which has been input to the high-frequency circuit net is measured, and the return loss (dB) calculated according to the following formula.

$$\text{Return loss (dB)} = -10 \log_{10} (P_2/P_1) \quad (1)$$

(Where $P_1$ is the electric power (W) input from the input terminal, and $P_2$ is the reflected electric power (W) which returns to the input terminal.)

As may be seen from FIG. 3, where matching of the optical modulator is inadequate, a frequency of 57.6 GHz produces a return loss of approximately 8 dB, while frequencies of 58.4 GHz, 59.6 GHz, 60.8 GHz and 61.6 GHz produce respective return losses of approximately 9 dB, 10 dB, 9 dB and 8 dB. Consequently, the maximum return loss (dB) is approximately 10 dB at 59.6 GHz.

In contrast, where matching of the optical modulator 18 has been optimised as in FIG. 4, a frequency of 57.6 GHz produces a return loss of approximately 9 dB, while frequencies of 58.4 GHz, 59.6 GHz, 60.8 GHz and 61.6 GHz produce respective return losses of approximately 12 dB, 30 dB, 12 dB and 7 dB.

A comparison between the two in terms of return loss (dB) at 59.6 GHz reveals an improvement from approximately 10 dB to approximately 30 dB as a result of optimisation of matching.

In this way, use of the high-frequency circuit to which the present first embodiment pertains makes it possible to achieve high-frequency characteristics with very favourable return loss even when frequencies in excess of 40 GHz are input from the microstrip line 14 side to the optical modulator 18, something which could not be achieved with a conventional high-frequency circuit configuration. That is to say, optimised matching of the optical modulator 18 means that electric power $P_2$ which is reflected and returns to the input terminal after for instance an electric power $P_1$ of 1000 W has been input from the input terminal is in the vicinity of 1 W. In contrast, where matching of the optical modulator is inadequate, roughly the same 1 W is reflected and returns to the input terminal as electric power $P_2$ after input of an electric power $P_1$ of 10 W, for instance, from the input terminal side.

In this first embodiment, it is preferable for the element length (L) of the optical modulator 18 to be as short as possible so as to ensure low capacity and high-speed operation for the optical modulator 18. As a result, problems may occur in matching the optical axes if the high-frequency circuit to which the first embodiments pertains is fitted to an optical modulation device.

Figure 5:
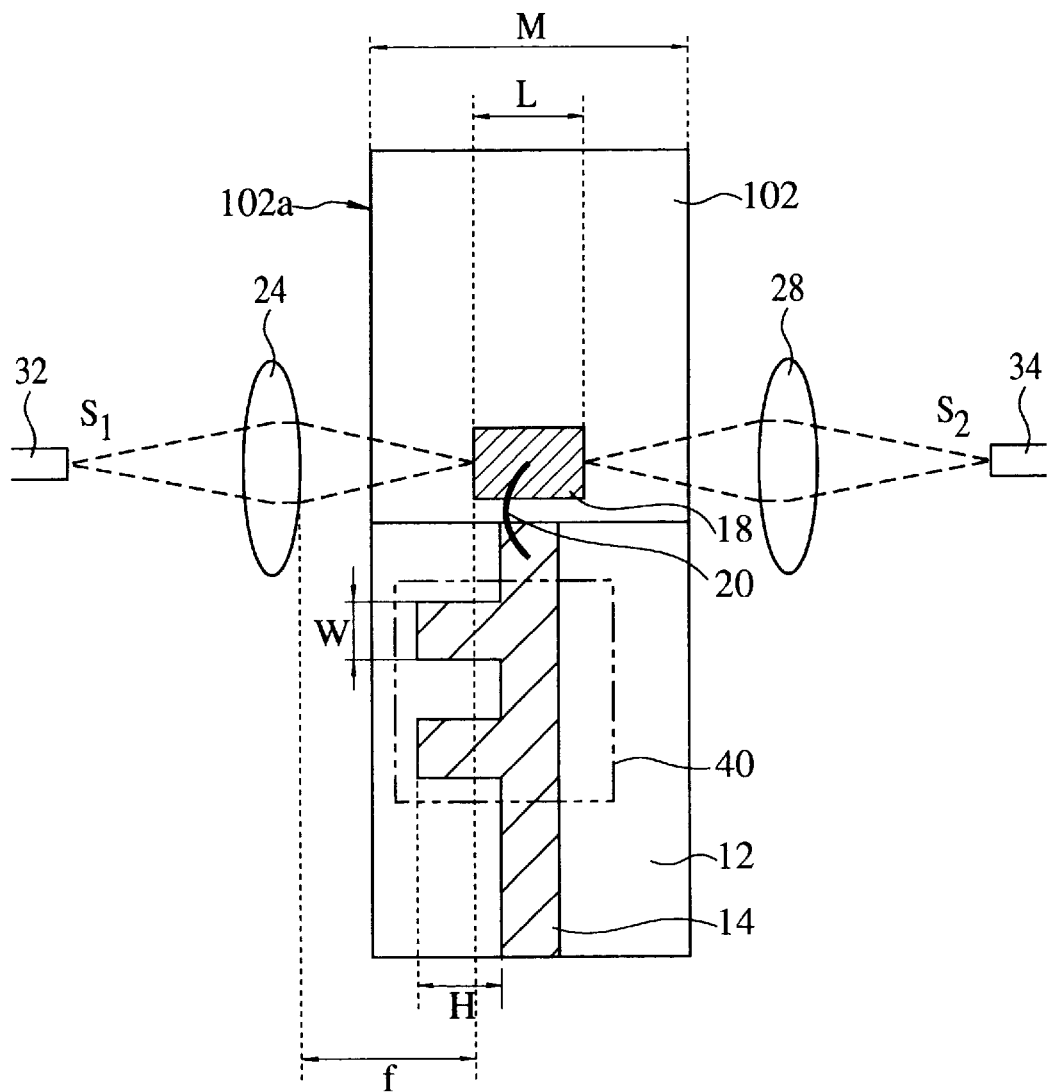
FIG. 5 is a view for elucidating lens and carrier positions when the high-frequency circuit to which the first embodiment of the present invention pertains is employed in an optical modulation device.
Figure 6:
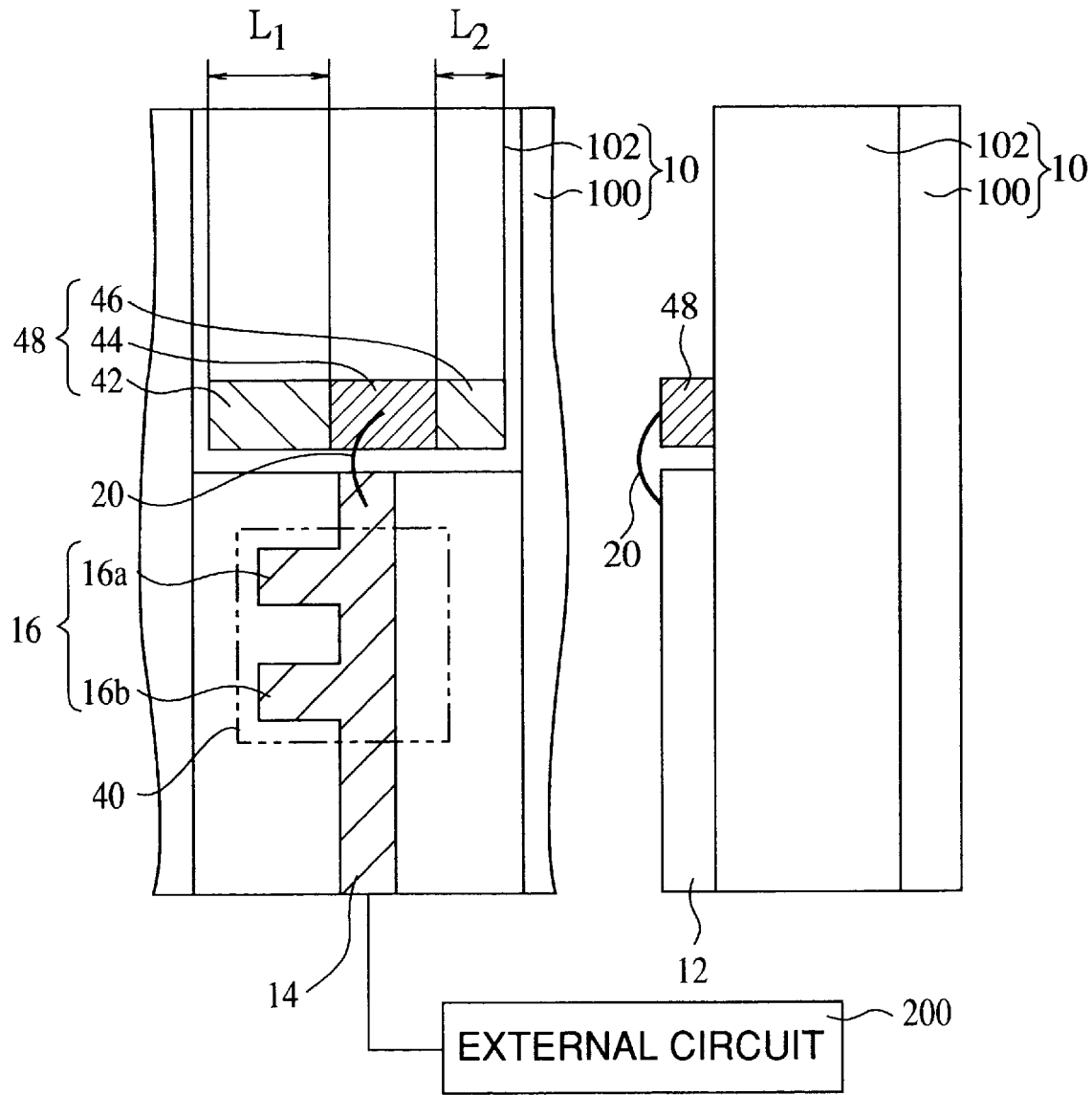
FIG. 6(A)–FIG. 6(B) are top and side views for explaining the configuration of the high-frequency circuit to which the second embodiment of the present invention pertains.

There follows, with reference to FIG. 5, an explanation of the problem of matching the optical axes which is associated with use of the high-frequency circuit to which the first embodiment pertains. FIG. 5 serves to elucidate lens and carrier positions in relation to this problem.

In the first embodiment, the open stubs 16 are located on the high-frequency substrate 12 in such a manner as to be connected to the microstrip line 14. This means that it is necessary for the high-frequency substrate 12 (or the carrier) to be wider than the conventional one.

When the high-frequency circuit to which the first embodiment pertains is employed, the position of the first lens 24 is determined in such a manner that when incident light ($S_1$) is directed on to the first lens 24, the focal length f of the first lens converges on the input side end of the optical modulator 18. This means that increasing the width (M) of the high-frequency substrate 12 can sometimes cause the first lens 24 and the end 102a of the convex section of the carrier 10 to conflict with each other. The second embodiment described below is configured so as to avoid this kind of situation.

(Second Embodiment: High-frequency Circuit)

The configuration of the high-frequency circuit to which the second embodiment pertains will be described with reference to FIG. 6(A) and FIG. 6(B). FIG. 6(A) and FIG. 6(B) are top and side views for explaining the configuration of the high-frequency circuit to which the second embodiment pertains. Those constituents which are common to both the first and second embodiments have been allocated the same reference numerals as those in the description of the first embodiment.

The second embodiment employs an optical modulator 48 with waveguide, that is, an optical waveguide modulator. This optical modulator 48 with waveguide comprises a first waveguide area 42, an optical modulator area 44, and a second waveguide area 46. The optical modulator area 44 is located in a direction which intersects at right-angles the direction of orientation of the microstrip line 14. The first guide wave area 42 is located on one side of this optical modulator area 44, which is to say along the optical input side, while the second guide wave area 46 is located on the other side of the optical modulator area 44, which is to say along the optical output side.

Moreover, in the second embodiment, the open stubs 16 are located on the high-frequency substrate 12 on the left-hand side in relation to the microstrip line 14. Consequently, lengthening the open stubs 16 means that the position of the microstrip line 14 is automatically shifted to the right. Moreover, as has already been explained, in the second embodiment the optical modulator area 44 of the optical modulator 48 with waveguide is located in such a manner that it intersects at right-angles the direction of orientation of the microstrip line 14. Furthermore, the length $L_1$ of the first waveguide area 42 is greater than the length $L_2$ of the second waveguide area 46.

The microstrip line 14 and the optical modulator 48 with waveguide are connected by means of the bonding wire 20.

By achieving matching impedance between the optical modulator 48 with waveguide and other circuits by virtue of the matching circuit 40, the configuration of the high-frequency circuit to which the second embodiment pertains makes it possible to achieve similar return loss characteristics to those achieved with the above first embodiment.

Figure 7:
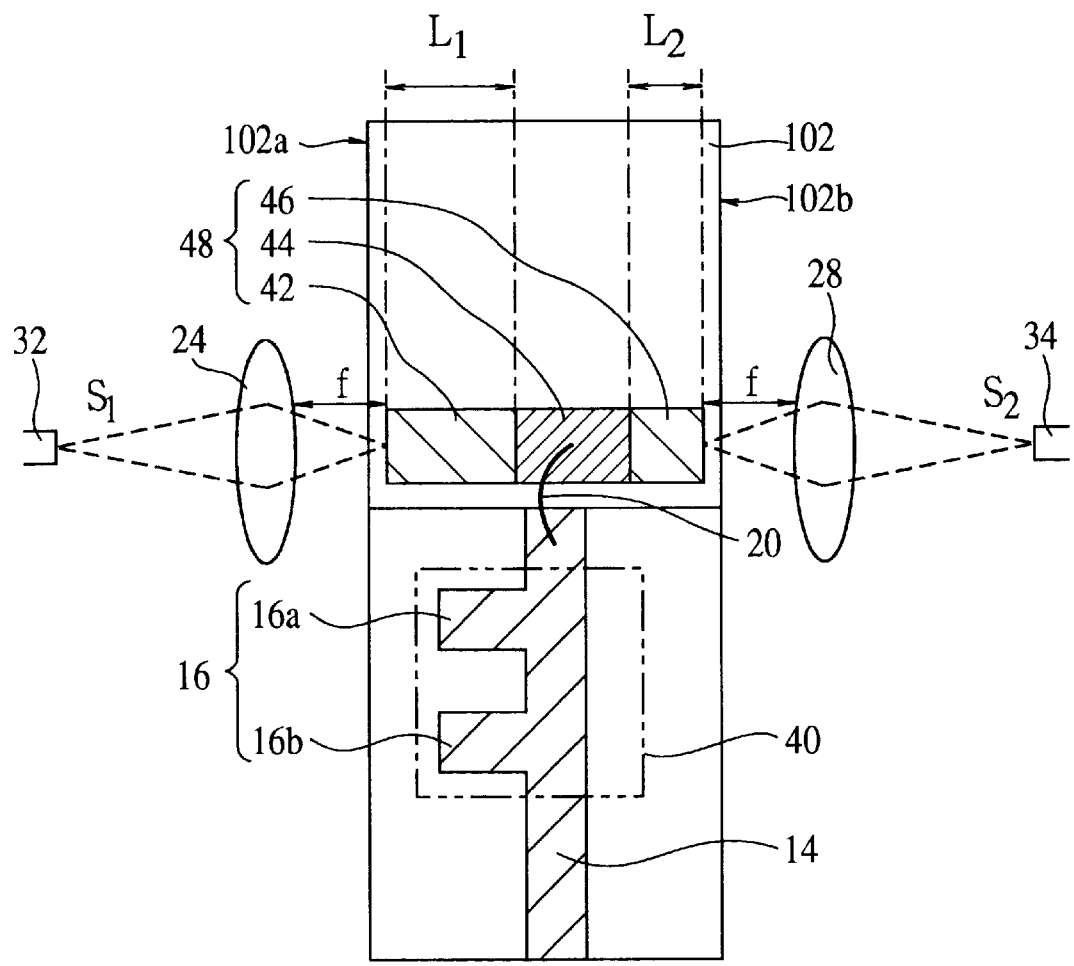
FIG. 7 is a view for elucidating lens and high-frequency circuit positions when the high-frequency circuit to which the second embodiment of the present invention pertains is employed in an optical modulation device.

Next, FIG. 7 will be referred to in order to explain the relationship with lens position where the high-frequency circuit to which the second embodiment pertains is employed in an optical modulation device. FIG. 7 serves to elucidate lens and high-frequency circuit positions in the high-frequency circuit to which the second embodiment of the present invention pertains.

The high-frequency circuit to which the second embodiment pertains employs the optical modulator 48 with waveguide along with the first waveguide area 42 and second waveguide area 46, and the position of the first lens 24 is determined in such a manner that incident light $S_1$ is directed on to the first lens 24, and converges on the incident end of the first waveguide area 42. It is therefore possible to distance the position of the first lens 24 from the convex section 102 by the length of the first waveguide area 42. This allows conflict between the first lens 24 and the end 102a of the convex section to be avoided, as also between the second lens 28 and the end 102b of the convex section.

The description of the above embodiments has concentrated on examples of methods which employ an optical modulator to ensure matching of the high-frequency circuit, but the optical modulator may be replaced by a laser diode module or photodiode module using a laser diode, photodiode or similar optical semiconductor element.

As will be clear from the above description, the high-frequency circuit and optical module to which the present invention pertains are provided with an open stub coupled to a microstrip line, constituting a matching circuit by virtue of which impedance matching is achieved between the high-frequency circuit and another circuit (high-frequency power supply circuit, driver circuit, amplifier circuit, etc.), and thus permitting superior high-frequency characteristics to be attained in comparison with hitherto.

Meanwhile, by trimming either or both the length and the width of the open stub while driving the optical semiconductor element with the aid of a high-frequency signal, the method of impedance matching to which the present invention pertains achieves accurate matching between the impedance of the high-frequency circuit containing the optical semiconductor element, and that of another circuit connected to it. Accordingly, use of the optical semiconductor element as an optical modulator makes it possible to attain stable high-frequency characteristics even in relation to high frequencies in excess of 40 GHz, something which was not attainable hitherto. As a result, the yield of the product improves markedly.

Moreover, in the present invention the high-frequency circuit employs an optical modulator with waveguide, the area of which extends in a direction which intersects at right-angles the direction of orientation of the microstrip line. This means that when this high-frequency circuit is applied to use in an optical module, it is possible to change the position of the focal length where light converges through the lens on to the optical modulator. Thus, the position of the lens can be distanced from the end of the substrate, allowing conflict between lens and substrate to be avoided.

What is claimed is:

1. A high-frequency circuit comprising:

a microstrip line;

an optical semiconductor element located at the tip of said microstrip line; and an open stub joined to the microstrip line;

said stub and the section of the microstrip line to which the stub is joined constituting a matching circuit; and impedance matching between the high-frequency circuit and an external circuit connected thereto being achieved by means of said matching circuit.

2. The high-frequency circuit according to claim 1, wherein the open stub is located in such a manner as to protrude from said microstrip line in a direction which intersects at right-angles the direction of orientation of the microstrip line.

3. The high-frequency circuit according to claim 1, wherein a plurality of said stubs is located parallel and separated from one another.

4. The high-frequency circuit according to claim 1, wherein the stub is located on one side in a direction which intersects at right-angles the direction of orientation of the microstrip line.

5. The high-frequency circuit according to claim 1, wherein the microstrip line assumes the shape of, a flat linear band of uniform width, while the stab is flat and rectangular in shape.

6. The high-frequency circuit according to claim 1, wherein the optical semiconductor element is an optical modulator, laser diode or photodiode.

7. The high-frequency circuit according to claim 1, wherein the optical semiconductor element and the microstrip line are connected by means of a bonding wire.

8. The high-frequency circuit according to claim 1, further comprising an electrically conductive carrier having a convex section in the shape of a rectangular parallelepiped, and a high-frequency substrate located on the top surface of said convex section, the matching circuit and optical semiconductor element being located on the upper surface of said high-frequency substrate.

9. An optical module comprising:

a microstrip line;

an optical semiconductor element located at the tip of said microstrip line; and a high-frequency circuit containing an open stub joined to the microstrip line;

said stub and the section of the microstrip line to which the stub is joined constituting a matching circuit; and impedance matching between the high-frequency circuit and an external circuit connected thereto being achieved by means of said matching circuit.

10. The optical module according to claim 9, wherein the open stub is located in such a manner as to protrude from said microstrip line in a direction which intersects at right-angles the direction of orientation of the microstrip line.

11. The optical module according to claim 9, wherein a plurality of said stubs is located parallel and separated from one another.

12. The optical module according to claim 9, wherein the stub is located on one side in a direction which intersects at right-angles the direction of orientation of the microstrip line.

13. The optical module according to claim 9, wherein the microstrip line assumes the shape of a flat linear band of uniform width, while the stab is flat and rectangular in shape.

14. The optical module according to claim 9, wherein the optical semiconductor element is an optical modulator, laser diode or photodiode.

15. The optical module according to claim 9, wherein the optical semiconductor element and the microstrip line are collected by means of a bonding wire.

16. The optical module according to claim 9, wherein the optical semiconductor element comprises an optical modulator with waveguide, said optical modulator with waveguide being provided with a first waveguide area, an optical modulator area, and a second waveguide area in that order, the first and second waveguide areas being located in a direction which intersects at right-angles the direction of orientation of the microstrip line.

17. The optical module according to claim 16, wherein the first and second waveguide areas are such as to have mutually differing lengths in the direction which intersects at right-angles the direction of orientation of the microstrip line.

18. The optical module according to claim 16, wherein the first and second waveguide areas are such that the lengths thereof in the direction which intersects at right-angles the direction of orientation of the microstrip line are modified according to the length of the stub.

* * * * *